United States Patent [19]

Kröger

[11] Patent Number: 5,243,527
[45] Date of Patent: Sep. 7, 1993

[54] TORQUE-REDUCING ENGINE CONTROL APPARATUS WITH EMERGENCY SWITCHING STAGE OPERABLE AS A FUNCTION OF THE DRIVE ENGINE OPERATING POINT

[75] Inventor: Torsten Kröger, Stuttgart, Fed. Rep. of Germany

[73] Assignee: Mercedes-Benz AG, Fed. Rep. of Germany

[21] Appl. No.: 937,757

[22] Filed: Sep. 1, 1992

[30] Foreign Application Priority Data

Sep. 7, 1991 [DE] Fed. Rep. of Germany ....... 4129783

[51] Int. Cl.⁵ .................... B60K 41/04; G06F 15/48
[52] U.S. Cl. ..................... 364/431.03; 364/424.1; 364/431.01; 180/197; 74/866
[58] Field of Search ............... 364/431.03, 431.01, 364/424.1; 180/197; 74/851, 852, 858

[56] References Cited

U.S. PATENT DOCUMENTS

| | | | |
|---|---|---|---|
| 4,228,700 | 10/1980 | Espenschied et al. | 74/866 |
| 4,266,447 | 5/1981 | Heess et al. | 74/858 |
| 4,355,550 | 10/1982 | Will et al. | 74/858 |
| 4,403,527 | 9/1983 | Mohl et al. | 74/851 |
| 4,520,694 | 6/1985 | Eschrich et al. | 74/858 |
| 4,809,660 | 3/1989 | Marsh et al. | 364/431.03 |
| 4,823,645 | 4/1989 | Gaus et al. | 74/866 |
| 4,838,124 | 6/1989 | Hamano et al. | 74/866 |
| 5,047,936 | 9/1991 | Ishii et al. | 74/858 |
| 5,101,687 | 4/1992 | Iwatsuki et al. | 364/424.1 |
| 5,103,694 | 4/1992 | Kobayashi et al. | 364/424.1 |
| 5,103,928 | 4/1992 | Danner et al. | 180/197 |

FOREIGN PATENT DOCUMENTS

| | | |
|---|---|---|
| 3512603 | 7/1986 | Fed. Rep. of Germany . |
| 3512604 | 6/1988 | Fed. Rep. of Germany . |
| 3841400 | 7/1989 | Fed. Rep. of Germany . |

Primary Examiner—Thomas G. Black
Assistant Examiner—Tan Q. Nguyen
Attorney, Agent, or Firm—Evenson, McKeown, Edwards & Lenahan

[57] ABSTRACT

An arrangement controls a drive engine when changing up a variable-speed transmission downstream in the power flow in order to reduce the engine torque. Given a lack of a torque reduction due to a malfunction, emergency operation is initiated in the system by accomplishing the change up rapidly through an increase in the operating pressure in the variable-speed transmission. To this end, an emergency switching stage, which operates as a function of the operating point of the drive engine, can be moved into a position to transmit a pressure control signal for the gear changing device of the variable-speed transmission when the gear change detection signal for the start of changing up is present and there is no check-back signal indicating the position of the actuator for reducing the engine torque. The engine operating point is located in a range of the engine ignition map so as to be selected for emergency operation.

5 Claims, 1 Drawing Sheet

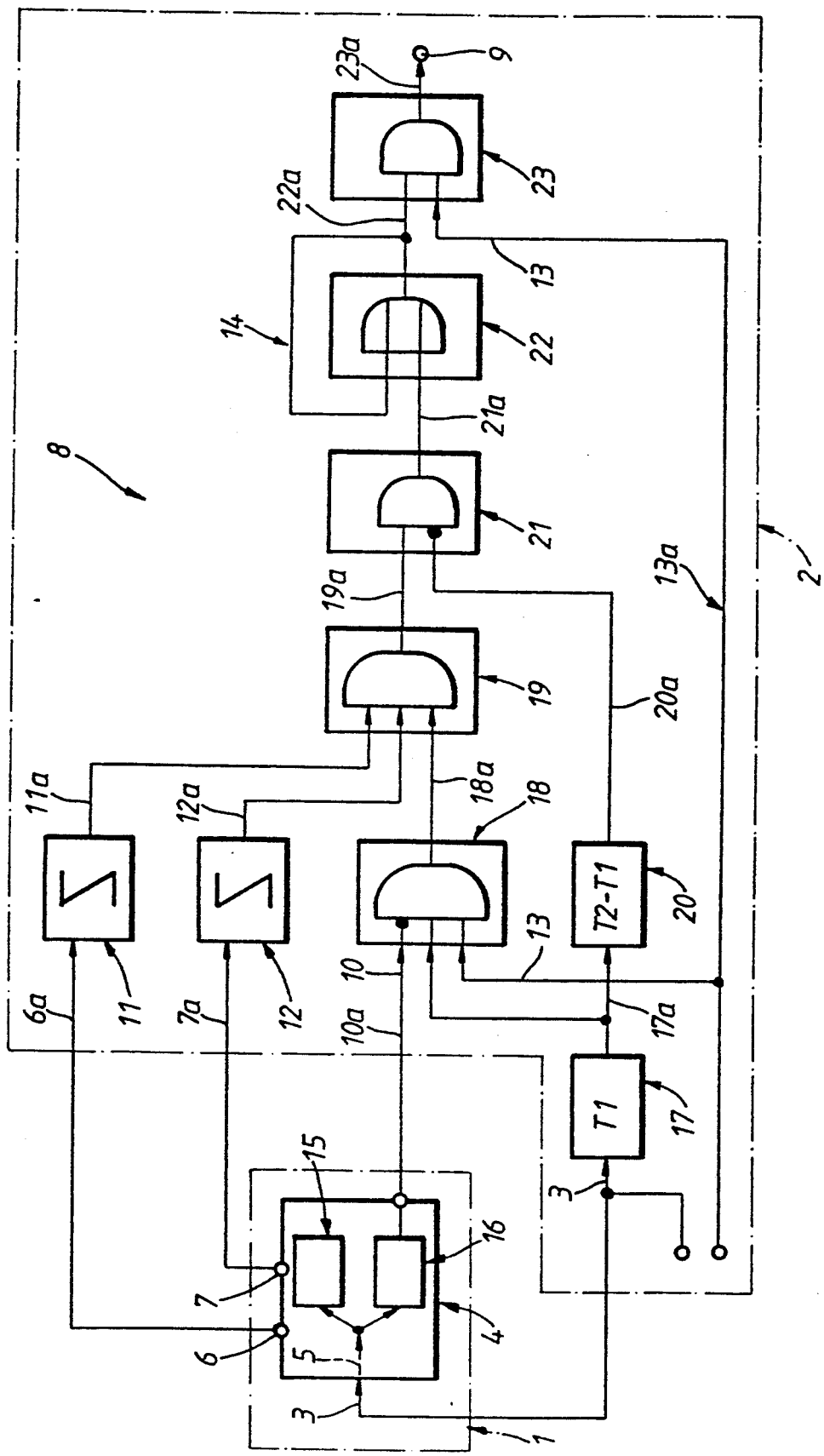

TORQUE-REDUCING ENGINE CONTROL APPARATUS WITH EMERGENCY SWITCHING STAGE OPERABLE AS A FUNCTION OF THE DRIVE ENGINE OPERATING POINT

CROSS-REFERENCE TO RELATED APPLICATIONS

This application is related to application Ser. No. 07/937,754 filed on Sep. 1, 1992 in the name of Wolfgang Trick, et al. for MOTOR VEHICLE CHANGE-SPEED GEARBOX; based upon an application in Germany on Sep. 7, 1991 having Ser. No. P 41 29 290.1, the subject matter of which is incorporated herein by reference.

BACKGROUND AND SUMMARY OF THE INVENTION

The present invention relates to an arrangement for controlling a drive engine in a range of an engine ignition map when changing up a variable-speed transmission downstream in the power flow in order to reduce engine torque, comprises a gear changing device and a switching stage operatively associated with the gear changing device such that a gear-change detection signal is generated at initiation of changing up by the gear changing device and causes the switching stage operating as a function of an engine operating point to transmit a trigger signal for bringing an actuator into a position for reducing the engine torque when an engine operating point is in a described range of the engine ignition map.

In a known control arrangement as shown in German Patent 3,512,603, the gear change detection signal for the start of changing up is obtained exclusively by evaluating the variation in the engine speed. This is done to make available, as it were, a replacement signal for reversing this switching stage in order, in the event of a malfunction, to the effect that a signal, generated by the gear changing device of the variable-speed transmission, for the start of gear changing remains ineffective with respect to the switching stage for triggering the torque reduction.

This known arrangement operates, therefore, as a so-called emergency program parallel to a second arrangement, in which the gear change detection signal for the start of changing up is generated by the gear changing device of the variable-speed transmission, as is shown in German Patent 3,512,604. In this latter arrangement, use is made as a gear change detection signal of a secondary gear change signal which depends on a transmission reaction to a primary gear change signal, is obtained synchronously with a reversal of the sense of rotation at a stallable reaction transmission member participating in the changeover, and becomes effective on the switching stage of a plant gear transmission for the purpose of triggering the torque reduction without time delay upon its occurrence.

DE 3,841,400 A1 discloses a device for detecting a malfunction of the interface at one end of a transmission line, in which the interface is provided at the other end of the transmission line. This device is applied in a system for controlling a motor vehicle by signal exchange between an electronic control system of a vehicle transmission and a further electronic control system of a vehicle engine. In order to maintain the comfort of the passengers as the vehicle is driven even in the situation when, for example as a consequence of a short circuit or an interruption of an acceleration resistor in the interface circuit, the interface circuit of the engine control system malfunctions as a result of vibrations or the like during driving, in this device aims to detect or identify at one end of a transmission circuit malfunctions of an interface circuit which is provided at the other end of the transmission line. In turn, this enables a transmission of a vehicle to be smoothly controlled during the gear change by optimizing the control of the interaction of the transmission and engine systems. In the conventional device, this optimization is provided by a transmission circuit in the transmission control system and monitoring circuit also in the transmission control system. An abnormality in an interface circuit that is provided in the engine control system is thereby detected, with a signal output being fed from the transmission control system via the transmission circuit to the monitoring circuit and via the interface circuit to the engine control system. In one application, the known device is used in a fault-free mode of operation to reduce the line pressure in the transmission and the engine torque during a gear change, in order to improve the gear changing performance with regard to smoothness or freedom from jolts. If an abnormality in the interface circuit of the engine control system occurs during a gear change, the transmission control system maintains the line pressure constant instead of reducing it. The aim is to obtain self-protection in this way.

An object of the present invention is also to initiate an emergency program in the engine control arrangement when the gear change detection signal for the start of changing up is present, independently of how it has been formed, and a reduction in the engine torque is lacking despite relevant parameters of the engine operating point. It is, however, desired that such an emergency program can run as far as possible independently of the engine control.

The foregoing object has been achieved according to the present invention in an advantageous way by an emergency switching stage configured to operate as a function of the operating point of the drive engine and arranged to be moved into a position to transmit a pressure control signal for the gear changing device of the variable-speed transmission with the presence of the gear change detection signal for the start of changing up and an absence of a check-back signal indicating the position of the actuator for reducing the engine torque, and the engine operating point is in a range of the engine ignition map selected for emergency operation.

Although, in the arrangement according to the present invention, the switching stage for reducing the engine torque is integrated in the known manner in an electronic ignition trigger and the reduction in the engine torque is performed by readjusting the ignition for retardation, the emergency program is covered by the transmission control which, for each ignition action, receives a check-back signal via a status bit from the electronic ignition trigger Lack of this check-back signal causes the transmission control system to increase the working pressure during the present gear change to such an extent that the change comes rapidly to an end and a risk to the gear changing element can thus be prevented. Due to this possibility of immediate reaction in each individual gear change, it is possible to eliminate from the engine control system a transmission protection emergency program designed to reduce the engine torque.

The normal transmission protection, i.e. the reduction of the engine torque, is detected as being correctly executed when the start of transmission protection, that is to say the start of reduction of the engine torque, is followed in the transmission control by a level change in the status bit. Otherwise, the pressure piling is selected, to the extent that testing of the load and speed thresholds intrinsic to the transmission control system indicate, such that the present change per se requires transmission protection in order to reduce the engine torque. However, if the status bit has already been set before the transmission protection request from the transmission control system, false triggering is suspected in the electronic ignition trigger, and the status bit is further monitored for the case that the electronic ignition trigger terminates the ignition action too early on its own. To be precise, the pressure piling then likewise further becomes effective.

This error logic thus presupposes that the electronic ignition trigger excludes the case of the status bit being at "1" although no ignition decay takes place.

Due to the thresholds intrinsic to the transmission control system, the load range for the execution of the operating pressure piling can be defined independently of the transmission protection load range of the electronic ignition trigger, it being more sensible to select a subset hereof.

BRIEF DESCRIPTION OF THE DRAWING

These and further objects, features and advantages of the present invention will become more readily apparent from the following detailed description of a currently preferred embodiment when taken in conjunction with the accompanying drawing constituting a schematic diagram of the engine controlling circuit.

DETAILED DESCRIPTION OF THE DRAWING

A drive engine is represented by an electronic ignition trigger in which a switching stage 4 is integrated. Depending on whether the engine operating point is located in a specific range of the engine ignition map, e.g. in the full load range, and a gear change detection signal 3 for the start of changing up is present, the switching stage 4 transmits a trigger signal 5 which causes a switchover of the ignition map such that the ignition angles, which are read out in the stationary operating state of the variable-speed transmission from a first ignition map 15, are now read out from a second ignition map 16 in the case of changing up, which is synonymous with an ignition readjustment towards "retarding", i.e. in the sense of a reduction in the engine torque.

The gear change detection signal 3 per se can be generated in any way in the change and control device 2 of the variable-speed transmission (not further represented), which is driven by the drive engine, but it ought to be available without a greater delay at the start of gear changing. This is fulfilled to a special extent in an arrangement in which as described in the above-mentioned related application, the disclosure of which is not necessary for an understanding of the present invention, the gear change detection signal is formed solely by evaluating the variation in the engine speed from a speed variable dependent on the temporal drop in the engine speed. That arrangement suppresses the formation of the gear change detection signal upon the occurrence of a variation in speed that is relevant but not determined by a gear change. The speed variable is dependent on the second derivative with respect to time, and the evaluation is performed over at least two consecutive clock cycles with the formation of clock-specific values of the speed variable and with the use of at least two different threshold values such that, in each clock cycle used for the evaluation, a comparison is performed between the clock-specific value, on one hand, and at least one of the threshold values, on the other hand, and the gear change detection signal is suppressed when at least one clock-specific specific value is smaller than one of the threshold values.

When the switching stage 4 is in the position for the ignition map 16 for readjusting the ignition towards retardation, a check-back signal 10 occurs at an output of the ignition trigger and is used to switch an emergency switching stage designated generally by numeral 8 of the change and control device designated generally by numeral 2 of the variable-speed transmission via a line 10a. The emergency switching stage 8 transmits at an output 23a a pressure control signal 9 which causes the pressure regulator of the change and control device 2 to increase the working pressure of the gear change actuators, so that the respective gear change is rapidly accomplished.

The gear change detection signal 3 is applied via a delay element 17 with a set delay time T1 through a line 17a to an input of an AND element 18 whose output 18a is connected to an input of a further AND element 19. The line 10a is connected to a negated input of the AND element 18 which also has a third input for a line 13a in which a switching signal 13 occurs during changing up, and which changes its level when the changing up is terminated, so that this signal can also be used to detect the end of changing up.

The signals of the respective engine speed are present at an output 6 of the ignition trigger. These engine speed signals are fed, via a line 6a, to a threshold value stage 11 of the emergency switching stage 8. The output 11a of the threshold value stage 11 is connected to a further input of the AND element 19.

The signals of the respective engine load are present at a further output 7 of the ignition trigger. These engine loads signals are fed, via a line 7a, to a threshold value stage 12 of emergency switching stage 8. The output 12a of the threshold value stage 12 is connected to a third input of the AND element 19.

The line 17a is connected to a further delay element 20 having a set delay time T2 and whose output 20a is connected to a negated input of a further AND element 21 to whose other input the output 19a of the AND element 19 is connected. The output 21a of the AND element 21 is connected to the one input of an OR element 22 of the self-latching switching stage 14, whose output 22a is connected to the one input of an AND element 23. The pressure control signal 9 occurs at the output 23a of the AND element 23. While the output 22a of the OR element 22 is still connected to the second input thereof for the purpose of achieving the self-latching function, the second input of the AND element 23 is connected to the line 13a for the gear change detection signal 13.

The delay time T1 of the delay element 17 is tuned so that the ignition trigger has available the trigger-specific reaction time in accordance with which the output-side check-back signal 10 occurs delayed with respect to the occurrence of the trigger signal 5 or of the gear change detection signal 3.

The delay time T2 of the delay element 20 is dimensioned so that no pressure control signal can be formed when the engine operating point reaches the range of the engine ignition map selected by the threshold value stages 11 and 12 too late after the occurrence of the gear change detection signal 3.

The AND element 18 switches through when, after the occurrence of the gear change detection signal 3, the delay time T1 has expired and the check-back signal 10 is not present. The AND element 19 switches through when the output signal of the AND element 18 and the output signals of the threshold value stages 11, 12 are present, that is to say when the engine operating point is in the selected range of the engine ignition map. If the latter is not yet the case, the OR element 22 is switched by the AND element 21 only if the delay time T2 has not expired and the selected range is reached within the delay time. In the latter case, the OR element 22 is latched by the self-latching circuit of its output 22a to one of its two inputs, so that the pressure control signal 9 is also necessarily held after it has occurred. Due to the connection of the inputs of the AND element 23 to the output 22a of the OR element 22 and to the line 13a, the pressure control signal 9 can be switched off only by the gear change detection signal 13 upon termination of changing up.

In order to set up a flashing code diagnosis, it is possible to provide a diagnosis switching stage which is switched as soon as the pressure increase has had to be activated in a specific percentage of the change ups executed in the relevant load range of the threshold value stages 11, 12. It is possible to this end to set up appropriate counter stages which are started by the pressure control signal 9 and evaluated upon termination of each change up. In this case, for example, a maximum of the last one hundred gear changes could be linearally evaluated, but the preceding groups of one hundred changes more weakly by a factor of ten, in each case.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. Arrangement for controlling an actuator of drive engine in a range of an engine ignition map when changing up a variable-speed transmission downstream in the power flow in order to reduce engine torque, comprising a gear changing device, a switching stage operatively associated with said gear changing device such that a gear-change detection signal is generated at initiation of changing up by said gear changing device and causes said switching stage operating as a function of an engine operating point to transmit a trigger signal for bringing said actuator into a position for reducing said engine torque when said engine operating point is in a described range of said engine ignition map, and an emergency switching stage configured to operate as a function of said operating point of said drive engine and arranged to be moved into a position to transmit a pressure control signal for said gear changing device of said variable-speed transmission with the presence of said gear change detection signal for the start of changing up and an absence of a check-back signal indicating the position of said engine operating point is in the described range of said engine ignition map selected for emergency operation.

2. The arrangement according to claim 1, wherein the emergency switching stage is configured to be movable into a position to switch off the pressure control signal via the gear change detection signal, tapped in said gear changing device of said variable-speed transmission, for an end of the changing up.

3. The arrangement according to claim 2, wherein a self-latching switching stage is provided for latching said emergency switching stage is provided for latching said emergency switching stage in a position for transmitting said pressure control signal, and said gear change detection signal along provides unlatching of said emergency switching stage for the end of the changing up.

4. The arrangement according to claim 1, wherein said emergency switching stage is configured such that changing thereof into a position for transmitting said pressure control signal is blocked when said engine operating point does not reach the range of said engine ignition map selected for emergency operation until expiration of a predetermined delay time with respect to occurrence of said gear change detection signal for the start of the changing up.

5. The arrangement according to claim 1, wherein said emergency switching stage is configured such that changing thereof into the position for transmitting said pressure control signal is blocked over the predetermined delay time with respect to occurrence of said gear change detection signal for the start of the changing up.

* * * * *